United States Patent [19]
Leboeuf et al.

[11] Patent Number: 6,140,459
[45] Date of Patent: Oct. 31, 2000

[54] SEMI-CRYSTALLINE, SEMI-AROMATIC COPOLYMERS WITH SUPERIOR POST-MOLDING SHRINKAGE AND BALANCE OF MECHANICAL PERFORMANCE

[75] Inventors: Christian Leboeuf, Kingston, Canada; Ryuichi Hayashi, Tokyo, Japan

[73] Assignee: E. I. du Pont de Nemours and Company, Wilmington, Del.

[21] Appl. No.: 08/895,638

[22] Filed: Jul. 17, 1997

Related U.S. Application Data

[60] Provisional application No. 60/025,481, Aug. 29, 1996.

[51] Int. Cl.[7] ............................. C08L 77/00; C08G 69/26
[52] U.S. Cl. .......................... 528/310; 528/332; 528/335; 528/336; 528/338; 528/339; 528/340; 524/600; 524/606; 524/607; 524/118; 524/409
[58] Field of Search ...................................... 528/310, 338, 528/340, 339, 349, 332, 335, 336; 524/606, 607, 600

[56] References Cited

U.S. PATENT DOCUMENTS

| Re. 34,447 | 11/1993 | Poppe et al. | 524/606 |
|---|---|---|---|
| 5,324,766 | 6/1994 | Ikejiri et al. | 524/433 |
| 5,504,146 | 4/1996 | Goetz et al. | 524/607 |
| 5,750,639 | 5/1998 | Hayashi | 528/340 |
| 5,849,826 | 12/1998 | Ogo et al. | 524/410 |
| 5,856,428 | 1/1999 | Hayashi et al. | 528/332 |

*Primary Examiner*—P. Hampton-Hightower

[57] ABSTRACT

This invention relates to high temperature, semi-crystalline, semi-aromatic nylon copolymers with improved shrinkage and blistering resistance, made from terephthalic acid (TA), hexamethylene diamine (HMD) and another aliphatic dicarboxylic acid as monomers. These polymers display superior % TD (Transverse Direction) annealing shrinkage, superior resistance to blistering when formulated with flame retardant additives and reinforcement under infrared (IR) reflow soldering conditions for electronic conectors, as well as a very good balance of mechanical performance as high temperature nylons.

7 Claims, 2 Drawing Sheets

SEMI-CRYSTALLINE, SEMI-AROMATIC COPOLYMERS WITH SUPERIOR POST-MOLDING SHRINKAGE AND BALANCE OF MECHANICAL PERFORMANCE

This application claims benefit of provisional application No. 60/025,481, filed Aug. 29, 1996.

BACKGROUND

This invention relates to high temperature, semi-crystalline, semi-aromatic nylon copolymers with improved shrinkage and blistering resistance, made from terephthalic acid (TA), hexamethylene diamine (HMD) and another aliphatic dicarboxylic acid as monomers. For many automotive or electrical/electronic applications, often rather complex parts are injection molded and dimensional stability of the moulded parts, under end-use conditions, becomes a critical attribute of performance. In these applications, post-molding performance or properties are strongly influenced by the level of crystallinity in a part, by the level of residual stresses in the polymer's amorphous phase and its moisture level. This is especially true for electronic/electrical (E/E) connector applications, where the cross-section of parts is rather thin, and where the same parts can be relatively long. Furthermore, these parts are molded under water-tempered mould conditions (i.e. $\leq 100°$ C. mould surface temperature) and often stored under humid conditions. For electronic connectors, component integrity and retention of pin position requires excellent dimensional stability under the high temperatures encountered during the soldering process. In many instances, when electronic connectors, made of these polyamides, are soldered to circuit boards using the Infrared Solder Reflow technique, high surface temperatures encountered with this process result in blistering of the plastic connector.

Many copolymers based on TA and HMD described in the patent literature or in commercial existence give very marginal performance in these applications. Such is the case for 6T/DT [50/50 molar ratio], the copolymer of hexamethylene terephthalamide (6T) and 2-methyl pentamethylene terephthalamide (DT) (U.S. Pat. No. 5,378,800 to Mok, Pagilagan; U.S. Pat. No. 5,322,923 to Lahary, Coquard) because of its high glass transition temperature (Tg) and high post-molding shrinkage. A terpolymer of hexamethylene terephthalamide/hexamethylene isophthalamide/hexamethylene adipamide (6T/6I/66) [65/25/10 molar ratio], based on 3 acids. TA, isophthalic acid (1A) and adipic acid (AA), and HMD (U.S. Pat. Re. 34,447 to Poppe, Lisle, et al.) has high mold and post molding shrinkages when molded in cold molds. Similar would be the situation for the hexamethylene terephthalamide/hexamethylene isophthalamide/hexamethylene sebacamide (6T/6I/610) terpolymer [70/20/10 molar ratio] (U.S. Pat. No. 5,424,104 to Amimoto et al.) because of its high Tg. Such would also be the case of the copolymer of hexamethyleneterephthalamide/caprolactam (6T/6) [70/30] (EP 413258, to Kopietz, Betz, Blinne, Koch) because of its high $T_g$. Copolymers of hexamethylene terephthalamide/hexamethylene adipamide (6T/66), based on TA, AA and HMD, at 55/45 molar ratio (U.S. Pat. No. 5,424,104) or 65/35 molar ratio (U.S. Pat. Re. 34,447) are functional in these "cold mold" injection molded parts, and display acceptable post mold shrinkage, but suffer in melt processability (i.e. thermal stability and flow), moisture adsorption and blistering resistance.

Polymers containing TA and HMD are generically described in the patent literature. Typical of that prior art is U.S. Pat. No. 5,200,450 to Blinne, Goetz, Hurley, Gutsche, Muehlbach (BASF) wherein the semi-aromatic polyamide is composed of I) 20–90% (wt) of units derived from terephthalic acid and hexamethylene diamine, ii) 0–50% (wt) of units derived from $\epsilon$-caprolactam, iii) 0–80% (wt) units derived from adipic acid and hexamethylene diamine, and iv) 0–40% (wt) of further polyamide-dorming monomers. Also typical of that prior art is U.S. Pat. No. 5,324,766 to Ikejiri, Yamamoto, Kawamoto (Mitsui Petrochemicals Company), where the semi-aromatic polyamide resin consists essentially of i) a dicarboxylic acid component recurring unit consisting of 30–100 mole % of terephthalic acid component unit and 0–40 mole % of an aromatic dicarboxylic acid component unit other than terephthalic acid and/or 0–70 mole % on an aliphatic dicarboxylic acid component unit having an alkylene group of 4–20 carbon atoms and ii) a diamine component recurring unit comprising an alkylene diamine component unit having an alkylene group of 4 to 25 carbon atoms. The prior art though fails to provide specific examples of copolymers based on (1) TA and an aliphatic dicarboxylic acid other than AA, as the 2 "acid" monomers, in conjunction with (2) HMD as the diamine. Furthermore, the prior art cited fails to teach the molecular structure criteria by which to choose monomer combinations which deliver low $T_g$, good dimensional stability under end-use conditions while at the same time maintaining high temperature performance and superior blistering resistance. In addition, none of the copolymers in commercial existence are based on HMD and 2 diacids, one being TA, the other, an aliphatic dicarboxylic acid other than AA, as briefly discussed above. The copolymers of the invention are based on TA and another aliphatic dicarboxylic acid, with HMD. These offer low post-molding shrinkage, good melt stability and processability, low moisture adsorption and excellent blistering resistance under SMT (surface mount technology) IR melt reflow soldering conditions required for electronic connectors.

SUMMARY OF THE INVENTION

A first embodiment of the semi-crystalline, semi-aromatic polyamide resin compositions of the invention comprise:
(1) copolymer compositions with low TD (transverse direction) annealing shrinkage, especially when molded articles are formed in "cold molds" (i.e. mold surface temperature <100° C.).
(2) the copolymers are composed of:
   i) terephthalic acid and another aliphatic dicarboxylic acid of 19 carbon atoms (9C), 10 carbon atoms (10C) or 12 carbon atoms (12C), and
   ii) hexamethylene diamine
where TA is 55–80 mole % of the diacid monomers and the other aliphatic dicarboxylic acid of 9C, 10C or 12C: 45–20 mole % of the diacid monomers
(3) furthermore, the copolymers have Tg$\leq 90°$ C., Tm $\leq 295°$ C. and high % relative crystallinity, for good high temperature performance.

A preferred first embodiment of the invention is a copolymer composition where terephthalic acid is present preferably in amounts in the range of 65–80 mole % of the diacid monomer and said other aliphatic acid is present preferably in the range of 35–20 mole % of the diacid monomer, the polymer has a Tg of less than or equal to 90° C. and a $T_m$ of at least 295° C.

A most preferred first embodiment of the invention is a copolymer composition of where terephthalic acid is present most preferably in amounts in the range of 70–80 mole % of the diacid monomer and said other aliphatic acid is present most preferably in the range of 30–20 mole % of the diacid monomer, the polymer has a Tg of less than or equal to 90° C. and a $T_m$ of at least 295° C.

a second embodiment of the invention is:
 (1) the copolymer of the first embodiment and,
 (2) optionally fillers and reinforcement
 (3) optionally, toughening agents.
 (4) optionally other additives such as antioxydants, stabilizers, processing aids, flow improvers, etc.

A third embodiment of the invention is:
a polymer composition comprising:
 A) 20–80 weight % of a copolymer semi-crystalline, semi-aromatic polyamide composed of i) terephthalic acid and at least one other aliphatic acid having 9 to 12 carbon atoms, and ii) hexamethylene diamine, where terephthalic acid is present in amounts in the range of 55–80 mole % of the diacid monomers, preferably in amounts in the range of 65–80 mole % of the diacid monomer, present most preferably in amounts in the range of 70–80 mole % of the diacid monomer, and said other aliphatic acid is present in the range of 45–20 mole % of the diacid monomers, preferably in the range of 35–20 mole % of the diacid monomer, most preferably in the range of 30–20 mole % of the diacid monomer, the polymer has a $T_g$ of less than or equal to 90° C. and a $T_m$ of at least 295° C.,
 B) 0–50 weight % of inorganic fillers selected from glass fiber, glass flakes, carbon fibers, or mineral fillers such as clay, kaoline, wollastonite, talc or any other minerals or any combination of those inorganic fillers.
 C) 10–35 weight % of a flame retardant containing 50–70 weight % bromine, preferably flame retardants such as brominated polystyrene, and brominated polyphenylene oxide, and most preferably polymeric flame retardants such as are brominated polystyrene;
 D) 1–10 weight % of a flame retardant synergist, preferably antimony compounds and other metal oxides and their combinations, most preferably sodium antimonate.

DESCRIPTION OF THE DRAWINGS

TD annealing shrinkage (%) as a function of mold temperature, for PA66 (Comparative Example 1), is shown in FIG. 1.

TD annealing shrinkage (%), as a function of mold temperature for Comparative Example 1, (PA66), Comparative Example 2 (6T/DT 50/50 copolymer), Comparative Example 3 (6T/66 55/45 copolymer), Comparative Example 4 (6T/DT/66 terpolymer), Comparative Example 5 (6T/DT/612 55/10/35 terpolymer) and Comparative Example 6 (6T/DT/612 50/25/25 terpolymer) is shown in FIG. 2.

DETAILED DESCRIPTION OF THE INVENTION

Figure 1:
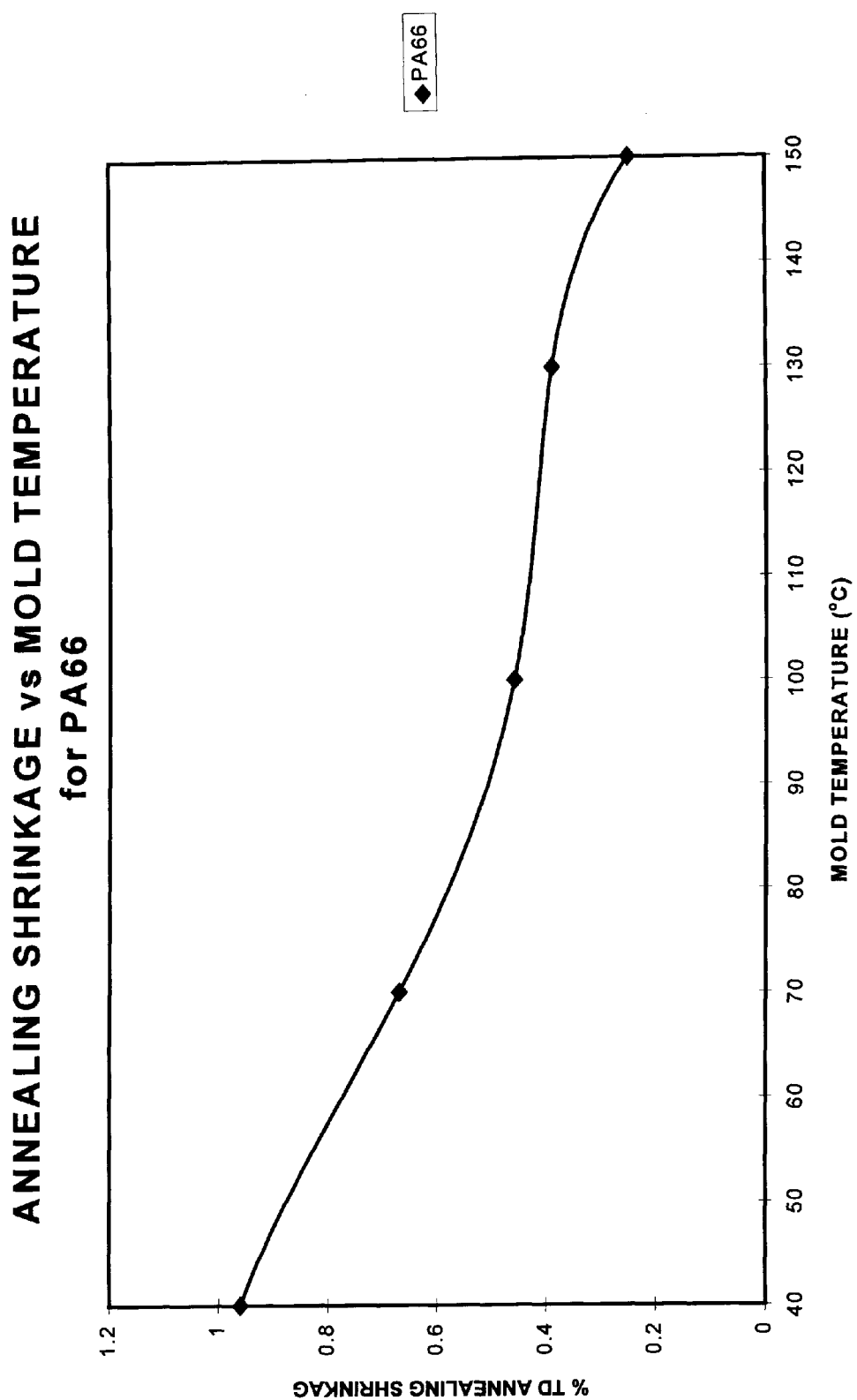

This invention seeks: i) to retain the good melt stability and low moisture adsorption of a copolymer like 6T/DT (50/50) and ii) to improve its crystallinity and/or its rate of crystallization beyond its intrinsic properties by replacing some of the terephthalic acid monomer with aliphatic dicarboxylic acids, while maintaining an acceptable balance of properties (e.g. mechanical performance, Tm, HDT, etc. . . .). One anticipated result of this partial replacement of TA with aliphatic dicarboxylic acids is a lowering of the Tg of 6T/DT (125° C. by DMA) to provide a full development of crystallinity and low post-molding shrinkage, even under "water tempered" mold conditions. For the development of new polymer compositions or new resin formulations, it is often impractical to resort to the evaluation of the functionality of the ultimate part (e.g. here an electronic connector) for screening purposes. Hence the great value of defining screening techniques based on a fundamental property response of these polymeric materials. We found that the most efficient way of assessing, and almost predicting, a polymer formulation's "fitness" under an electronic connector's end-use environment and conditions, was through the measurement of its % TD (Transverse Direction) annealing shrinkage.

This special technique was designed to quantify improvements made to the dimensional stability of different materials through polymer formulation changes. The key elements of that procedure are as follows.

The base polymers are compounded with 35% glass fiber, talc and (usually) a heat stabilizer. The compounded materials are molded using a Nissei 185 Ton I/M (injection molding) machine. The mold is a tri-level or stepped plaque mold which is gated at one end. Proceeding in the flow direction from the gate, are 3 different areas of 3 different thicknesses. The thinnest section is the one farthest from the gate and the thickest section is nearest the gate. The width of the mold (and therefore of all 3 sections) is 4.125". Respectively, the 3 thicknesses are 0.025", 0.075" and 0.125". The mold surface temperature is controlled by a hot oil heat transfer system and can be varied at will. For each mold temperature, 5 plaques are used to measure the annealing shrinkage. After molding, the plaques are cut along the boundaries between the different thicknesses, at the steps. The dry-as-molded (DAM) width of the plaque is measured using dial calipers (to 0.0001") across it's middle, using marks to indicate where the measurement is made, each plaque having been individually labeled. The dimension transverse to polymer flow is chosen because of its more sensitive response to annealing conditions. Dimensional changes also occur in the flow direction, but they are much smaller because of the orientation of the glass fibers with flow.

The samples are then heated in an oven at 185° C. for 3 hours and cooled back to room temperature. They are then either measured right away or kept dry if not. The width of each plaque is re-measured, as before. Note: the plaques are pushed flat during measurement to eliminate any slight warpage effects. The difference between each set of width measurements, divided by the original width, ×100 gives the % TD annealing shrinkage for the plaque. These are averaged for the 5 plaques made under the same conditions. Constant molding conditions are used, except for the difference in mold temperature. Also, when different polymers are used, the barrel temperatures may be adjusted accordingly (e.g. lower melt temperatures used for Nylon 66 than for high temperature nylons.

With the aid of this technique, it is straightforward to establish that there are 2 contributing factors to TD annealing shrinkage: one linked to "crystallinity" (i.e. dimensional changes taking place while full crystallization is achieved under annealing conditions), the other, and often a more significant factor in parts molded under "cold mold" conditions (i.e. mold surface temperature <100° C.) is the stress relaxation phenomenon taking place when the sample is annealed at a temperature above its Tg. For instance, for a semi-crystalline and fast crystallizing polymer like Nylon 66, TD annealing shrinkage is essentially all linked to "molded-in-stresses" which are relaxed during the annealing process since, as evidenced by Differential Scanning Calorimetry (DSC), full potential crystallinity (i.e. no crystallization exotherm observed on the DSC scan) is achieved essentially at any mold temperature selected over a reasonable and practical range. The data for 35% Glass filled PA66 is shown in Table 1 below, and this effect of mold temperature is plotted in FIG. 1.

TABLE 1

| COMPARATIVE | | % TD ANNEALING SHRINKAGE MOLD TEMPERATURE (° C.) | | | | |
|---|---|---|---|---|---|---|
| Example | POLYMER | 40 | 70 | 100 | 130 | 150 |
| 1 | PA66 | 0.96 | 0.67 | 0.46 | 0.39 | 0.25 |

The DAM (Dry-as-molded) Tg of PA66 is very low (50° C.) and is very sensitive to moisture, which explains why this polymer is able to achieve its full potential crystallinity over a significant mold temperature range. For PA66, as for many other semi-crystalline polymers, dimensional changes due to crystallization represent only a fraction of the total shrinkage, especially for samples molded at low mold temperatures. Dimensional changes caused by stress relaxation become significantly more important, as molding temperature decreases (i.e. for lower mold surface temperatures).

Synthesis: Examples A–D, and F–L

Several examples of synthesis of copolymers, based on:
(1)TA and i) another aliphatic dicarboxylic acid of 9C, 10C or 12C, and
(2) HMD
are reviewed in this section.

Synthesis was accomplished according to the process described here for Example D; recipes and process conditions for different candidate compositions are summarized in Table 2.

A 12 liter reaction vessel equipped with a helical ribbon agitator and a thermowell to measure reaction temperature, was charged with 1746 g (15.05 moles) of hexamethylene diamine as a 77.04% (wt) aqueous solution (2266 g of solution), 1584 g terephthalic acid (9.54 moles), 1182 g of dodecanedioic acid (5.14 moles), 3.94 g of a 25% aqueous solution of sodium hypophosphite, 7.88 g of a 1% water emulsion of Dow Corning B antifoam, 28 g of acetic acid and 1500 g of demineralized water. With the reactor agitator rotating at 50 rpm, the mixture was heated to 130° C. and then vented to remove entrained oxygen. Subsequently, the reaction mixture was heated to 219° C. (T2A in Table 2), at an autogenous pressure of 270 psig (P2A in Table 2). With the vessel pressure maintained at P2A of 270 psig, volatile matter was vented over a period of 76 minutes (t2A in Table 2) up to a melt temperature of 240° C. (T2A in Table 2). Then the reactor's PVC was closed and temperature was raised to 259° C. (T2B) in Table 2 at an autogenous pressure of 400 psig (P2B in Table 2). With the vessel pressure maintained at P2B of 400 psig, volatile matter was further vented over a period of 51 minutes (T2B in Table 2) until $T_{melt}$ reached a temperature of 310° C. (T3A in Table 2), at which point the 3rd polymerization cycle, pressure reduction, was initiated. Pressure in the reactor was then reduced from 400 psig to 265 psig over a period of 32 min (t3A in Table 2) corresponding to a melt temperature of 323° C. (T3B in Table 2). The vent rate was then increased in order to reduce pressure to atmospheric (P3B in Table 2) over a period of 34 minutes (t3B in Table 2), at which point the agitator rotational speed was reduced to 5 rpm, and vacuum was applied to the reaction vessel to finish polymerization. The melt temperature at the start of the vacuum cycle was 331° C. (T4 in Table 2), and a vacuum of −7" Hg (see Table 2) was applied for 11 minutes. The polymer obtained was at a final $T_{melt}$ of 333° C. (see Table 2) and was then discharged through a 2 hole die using $N_2$ pressure, over a period of 14 minutes (see t5 in Table 2), quenched in a water bath and pelletized.

TABLE 2

| EXAMPLE | PRODUCT | MONOMER RATIO | END CAP | Wt(g) | % XS MOLAR HMD | HMD mole | HMD wt (g) | TA mole | TA wt (g) | OTHER ACID mole | OTHER ACID wt (g) | $H_2O$ wt (g) | 25% SOL SHP wt (g) | 1% EMUL. DC-B wt (g) | 1ST CYCL. t1 (min) |
|---|---|---|---|---|---|---|---|---|---|---|---|---|---|---|---|
| A | 6T/612 | 50/50 | — | — | 2.0 | 11.36 | 1318 | 10.40 | 1726 | 5.07 | 1025 | 1200 | 3.94 | 3.94 | 52 |
| B | 6T/612 | 55/45 | — | — | 2.0 | 14.62 | 1696 | 7.89 | 1309 | 7.35 | 1484 | 1200 | 3.94 | 3.94 | 62 |
| C | 6T/612 | 60/40 | BENZOIC | 50 | 2.0 | 14.79 | 1716 | 8.70 | 1445 | 5.80 | 1334 | 1300 | 3.94 | 7.88 | 67 |
| D | 6T/612 | 65/35 | ACETIC | 27.5 | 2.5 | 15.05 | 1746 | 9.54 | 1584 | 5.14 | 1182 | 1500 | 3.94 | 7.88 | 71 |
| E | 6T/612 | 70/30 | — | — | — | 14.85 | 1723 | 10.40 | 1726 | 4.46 | 1025 | 1800 | — | 7.88 | 56 |
| F | 6T/610 | 45/55 | BENZOIC | 40 | 1.5 | 15.04 | 1745 | 6.67 | 1107 | 8.15 | 1647 | 1200 | 3.94 | 7.88 | 59 |
| G | 6T/610 | 50/50 | BENZOIC | 40 | 1.5 | 15.15 | 1757 | 7.46 | 1239 | 7.46 | 1507 | 1200 | 3.94 | 3.94 | 67 |
| H | 6T/610 | 55/45 | BENZOIC | 40 | 1.5 | 15.25 | 1769 | 8.27 | 1372 | 6.76 | 1365 | 1200 | 3.94 | 3.94 | 73 |
| I | 6T/610 | 60/40 | BENZOIC | 50 | 2.0 | 15.43 | 1781 | 9.08 | 1507 | 6.05 | 1222 | 1500 | 3.94 | 7.88 | 61 |
| J | 6T/610 | 65/35 | BENZOIC | 55 | 2.0 | 15.53 | 1802 | 9.90 | 1644 | 5.32 | 1077 | 1500 | 3.94 | 7.88 | 76 |
| K | 6T/69LQ | 65/35 | BENZOIC | 55 | 2.5 | 15.92 | 1847 | 10.10 | 1676 | 5.44 | 1022 | 1500 | 3.94 | 7.88 | 72 |
| L | 6T/69HQ | 65/35 | BENZOIC | 55 | 2.5 | 15.92 | 1847 | 10.10 | 1676 | 5.44 | 1022 | 1500 | 3.94 | 7.88 | 70 |

| EXAMPLE | PRODUCT | 2nd CYCLE | | | | | | 3rd CYCLE | | | | | |
|---|---|---|---|---|---|---|---|---|---|---|---|---|---|
| | | STAGE 1 T2A (° C.) | HOLD "P" P2A (PSIG) | TIME t2A (min) | STAGE 2 T2B (° C.) | HOLD "P" P2B (PSIG) | TIME t2B (min) | STAGE 1 T3A (° C.) | REDUC. TO P3A (psig) | TIME t3A (min) | STAGE 2 T3B (° C.) | REDUC. TO P3B (psig) | TIME t3B (min) |
| A | 6T/612 | 223 | 250 | 56 | | | | 275 | 0 | 46 | | | |
| B | 6T/612 | 227 | 320 | 83 | | | | 300 | 0 | 61 | | | |
| C | 6T/612 | 226 | 320 | 92 | | | | 300 | 0 | 81 | | | |

TABLE 2-continued

| | | | | | | | | | | | | | |
|---|---|---|---|---|---|---|---|---|---|---|---|---|---|
| D | 6T/612 | 219 | 270 | 76 | 259 | 400 | 51 | 310 | 265 | 32 | 323 | 0 | 34 |
| E | 6T/612 | 226 | 320 | 49 | 250 | | | | | | | | |
| F | 6T/610 | 227 | 320 | 71 | | | | 300 | 275 | 16 | 306 | 0 | 43 |
| G | 6T/610 | 229 | 320 | 76 | | | | 280 | 0 | 62 | | | |
| H | 6T/610 | 231 | 335 | 73 | | | | 277 | 0 | 60 | | | |
| I | 6T/610 | 231 | 345 | 75 | | | | 303 | 0 | 62 | | | |
| J | 6T/610 | 234 | 360 | 73 | | | | 310 | 0 | 68 | | | |
| K | 6T/69LQ | 223 | 270 | 81 | 265 | 400 | 47 | 309 | 265 | 27 | 323 | 0 | 31 |
| L | 6T/69HQ | 223 | 270 | 73 | 258 | 400 | 67 | 310 | 265 | 37 | 323 | 0 | 34 |

| | | 4th CYCLE | | | 5TH CYCL. | TOTAL | FINAL | | | | | |
|---|---|---|---|---|---|---|---|---|---|---|---|---|
| EXAM-PLE | PRO-DUCT | Tmelt T4 (° C.) | VACUUM (in Hg) | TIME t4 (min) | CASTING t5 (min) | RUN TIME(min) | $T_{melt}$ (° C.) | Wt (g) CAST | Wt (g) OUT | YIELD CAST % | YIELD OUT % | BATCH SIZE (g) |
| A | 6T/612 | 320 | 0 | 7 | 23 | 184 | 320 | 2055 | 2973 | 52 | 75 | 3940 |
| B | 6T/612 | 318 | 0 | 18 | 25 | 249 | 319 | 2556 | 3282 | 65 | 83 | 3940 |
| C | 6T/612 | 320 | −5 | 15 | 14 | 269 | 324 | 2532 | 3176 | 64 | 81 | 3940 |
| D | 6T/612 | 331 | −7 | 11 | 14 | 289 | 333 | 2225 | 2800 | 56 | 71 | 3940 |
| E | 6T/612 | | | | | 190 | 250 | 4187 | 4187 | 100 | 100 | 3940 |
| F | 6T/610 | 313 | 0 | 18 | 18 | 225 | 313 | 2200 | 4165 | 56 | 106 | 3940 |
| G | 6T/610 | 317 | −10 | 15 | 21 | 241 | 317 | 2660 | 3580 | 68 | 91 | 3940 |
| H | 6T/610 | 317 | −12 | 15 | 22 | 243 | 318 | 2890 | 3367 | 73 | 85 | 3940 |
| I | 6T/610 | 323 | −5 | 10 | 15 | 223 | 324 | 2837 | 3417 | 72 | 87 | 3940 |
| J | 6T/610 | 333 | −12 | 8 | 21 | 246 | 331 | 2462 | 2969 | 62 | 75 | 3940 |
| K | 6T/69LQ | 332 | −9 | 13 | 13 | 284 | 334 | 2224 | 3005 | 56 | 76 | 3940 |
| L | 6T/69HQ | 331 | −10 | 9 | 14 | 304 | 331 | 2433 | 3155 | 62 | 80 | 3940 |

The polymer obtained had an inherent viscosity (IV) of 0.90 dL/g; in these instances, inherent viscosity was measured on a 0.5 g/L solution in m-Cresol at 25° C. The polymer had a melting point of 310° C. (see Table 3), as measured by differential scanning calorimetry (DSC; ASTM D3418).

Recipes and process conditions for all examples presented in this patent are found in Table 2, and as appropriate, process cycle components are changed for their respective values in the "generic" example provided above. The process described above is an example of a 2-stage 2nd polymerization cycle (venting at constant pressure) and 2-stage $3^{rd}$ polymerization cycle (venting to atmospheric pressure).

Synthesis: Example E

A 12 liter reaction vessel equipped with a helical ribbon agitator and a thermowell to measure reaction temperature, was charged with 1723 g (14.85 moles) of hexamethylene diamine as a 77.89% (wt) aqueous solution (2212 g of solution), 1726 g terephthalic acid (10.40 moles), 1025 g of dodecanedioic acid (4.46 moles), 3.94 g of a 1% water emulsion of Dow Corning B antifoam, and 1800 g of demineralized water. With the reactor agitator rotating at 50 rpm, the mixture was heated to 130° C. and then vented to remove entrained oxygen. Subsequently, the reaction mixture was heated to 226° C. (T2A in Table 2), at an autogenous pressure of 320 psig (P2A in Table 2). With the vessel pressure maintained at P2A of 320 psig, volatile matter was vented over a period of 49 minutes (t2A in Table 2) up to a melt temperature of 2500° C. (T2A in Table 2). Then the reactor's PVC was closed and the contents of the reactor was discharged through a spray-drying nozzle, using the autoclave's internal steam pressure. In that fashion, an oligomer powder was collected in a sufficiently large enclosure to allow separation of the steam from the solids and yielding an oligomer containing no more than 5% (wt) residual moisture.

The oligomer thus obtained has an inherent viscosity (IV) of 0.27 dL/g; in these instances, inherent viscosity was measured on a 0.5 g/L solution in m-Cresol at 25° C. The oligomer had a melting point of 317° C., as measured by differential scanning calorimetry (DSC; ASTM D3418).

The oligomer was dried overnight at 95° C., under nitrogen, then finished to a final IV of 0.82 dL/g using a co-rotating non-intermeshing twin-screw extruder. The water of reaction generated during the extrusion finishing step was removed through a vacuum port.

Crystalline properties, determined from polymer pellets, as produced from the autoclave reactor described in Example D, are summarized in Table 3. The terminology used in Table 3 is defined as follows:

TABLE 3

| EXAM-PLE | PRO-DUCT | MONOMER RATIO | IV (dL/g) | $T_{cc}^{ex}$ (° C.) | $\Delta H_c^{ex}$ (J/g) | $T_m^i$ (° C.) | $\Delta h_m^i$ (J/g) | PELLET CRYST. FRAC. % | $T_C^{PK}$ (° C.) | $\Delta H_c$ (J/g) | $T_m^r$ (° C.) | $\Delta H_m^r$ (J/g) | DMA (E') $T_g$ (° C.) |
|---|---|---|---|---|---|---|---|---|---|---|---|---|---|
| A | 6T/6,12 | 50/50 | 1.31 | 80 | 14.0 | 272 | 40.2 | 65.1 | 205 | 15.1 | 258 | 14.8 | |
| B | 6T/6,12 | 55/45 | 1.19 | 89 | 17.0 | 285 | 45.6 | 62.6 | 241 | 25.2 | 284 | 25.0 | |
| C | 6T/6,12 | 60/40 | 0.89 | — | 0 | 298 | 54.9 | 100 | 275 | 51.1 | 299 | 69.8 | 54 |
| D | 6T/6,12 | 65/35 | 0.90 | — | 0 | 310 | 43.3 | 100 | 283 | 47.3 | 306 | 43.8 | 78 |
| E | 6T/6,12 | 70/30 | 0.82 | — | 0 | 342 | 55.1 | 100 | 290 | 46.9 | 321 | 46.9 | |
| F | 6T/6,10 | 45/55 | 0.94 | 104 | 28 | 263 | 50.9 | 44.5 | 218 | 17.3 | 263 | 15.2 | |

TABLE 3-continued

| EXAMPLE | PRODUCT | MONOMER RATIO | IV (dL/g) | $_{ex}T_{cc}$ (° C.) | $\Delta H_c^{ex}$ (J/g) | $T_m^i$ (° C.) | $\Delta h_m^i$ (J/g) | PELLET CRYST. FRAC. % | $T_c^{PK}$ (° C.) | $\Delta H_c$ (J/g) | $T_m^r$ (° C.) | $\Delta H_m^r$ (J/g) | DMA (E') $T_g$ (° C.) |
|---|---|---|---|---|---|---|---|---|---|---|---|---|---|
| G | 6T/6,10 | 50/50 | 1.03 | 100 | 23 | 279 | 43.2 | 46.5 | 234 | 27.7 | 277 | 27.0 | |
| H | 6T/6,10 | 55/45 | 1.07 | 102 | 24 | 286 | 51.1 | 53.3 | 245 | 28.8 | 287 | 38.1 | |
| I | 6T/6,10 | 60/40 | 0.98 | — | 0 | 299 | 50.2 | 100 | 267 | 45.4 | 302 | 32.3 | |
| J | 6T/6,10 | 65/35 | 0.88 | — | 0 | 310 | 49.6 | 100 | 281 | 52.5 | 310 | 30.5 | |
| K | 6T/6,9HQ | 65/35 | 1.05 | 115 | 1.7 | 305 | 48.1 | 96.4 | 267 | 30.5 | 299 | 16.9 | 84 |
| L | 6T/6,9LQ | 65/35 | 0.99 | — | 0 | 307 | 38.7 | 100 | 274 | 35.6 | 306 | 14.4 | 85 |

$_{ex}T_{cc}$: Temperature at which the "cold crystallization", as seen on the DSC (i.e. crystallization which occurs at temperatures below the melting point of the polymer, but usually above the $T_g$) takes place. For polymer compositions having high rates of crystallization, no $_{ex}T_{cc}$ is observed. These compositions are more likely to perform under "cold mold" conditions, provided their $T_g$ is sufficiently low.

DELTA $H_{cc}^{ex}$:

Heat of "cold crystallization", in J/g. It is used in the calculation of the pellet crystalline fraction (%).

$T_m^i$: Melting point, initial melt curve.

DELTA $H_m^i$.

Heat of fusion, from the initial melt curve.

PELLET CRYSTALLINE FRACTION (%):

The ratio of "net crystallinity" to "total crystallinity"× 100, where:
  "net crystallinity"=$\Delta H_m^i - \Delta H_{cc}^{ex}$
  "total crystallinity"=$\Delta H_m^i$ $T_c^{pk}$: Defined as the peak temperature at which crystallization occurs when a polymer composition is cooled from the melt. The $T_c^{pk}$ can be used as a measure of a positive improvement of crystalline properties when $T_c^{pk}$ is shifted to a higher temperature (i.e. the polymer starts to crystallize at a higher temperature, so it has higher probability of crystallizing fully before it reaches its $T_g$, below which temperature little happens in the amorphous phase).

DELTA $H_c$:

Heat of crystallization (J/g)

$T_m^r$: Temperature of fusion (or melting point) from the remelt curve. Although not necessarily related to superior crystalline properties, the melting point, as measured by DSC during the remelt of the polymer, is important with respect to end-use performance. For certain E/E applications involving high temperature soldering, a high melting point is important. It may translate into superior retention of pin placement.

DELTA $H_m^r$:

Heat of fusion, from the remelt curve. The enthalpy of melting (heat of fusion) determined by DSC using the remelt curve, is a measure of the maximum level of crystallinity that can be achieved for a given monomer composition.

$T_g$: Glass transition temperatures were obtained by DMA (Dynamic Mechanical Analysis) dry as molded (ASTM E1640)

General Compounding:

Examples C, D, I, J, K, L and Comparative Examples 1–7

The glass filled polyamide samples were prepared as follows: the polyamide was blended in a V-shaped blender with a copper antioxidant, and talc (about 0.35%). The resultant blended mixture and silanated long glass fibers were fed through separate ports on a 20 mm Welding Engineers twin screw extruded that was operated at a melt temperature of 325° C., under vacuum. The resultant reinforced polyamide composition was passed through a stranding die and chopped into pellets. In one composition containing 54 parts of glass fiber per 100 parts of polyamide, the composition contained 4000 g of polyamide, 23 g of antioxidant, 23 g of talc and 2160 g of silanted long glass fibers.

General Molding of 35% GR Samples:

Examples C, D, I, J, K, L and Comparative Examples 1–7

The glass reinforced compositions were molded into test specimens using an Engel® I/M machine. Plaques from the 3-step mold, required for the measurement of TD annealing shrinkage, were molded on a Nissei® 185 tons I/M machine. The test samples were TYPE I tensile bars as specified in ASTM procedure D638, and ¼" and/or ⅛" flexural bars as specified in ASTM procedure D790. The test specimens were molded using a mold temperature of 100° C., except for the 3-step plaques used to study the effect of mold temperature on TD annealing shrinkage which were molded at different mold temperatures, as specified for the needs of the study. For glass filled samples, an extruder barrel temperature of 325° C. is used. Measurements were made using the following ASTM procedures: Flexural Modulus D790; Tensile Strength D638. Melting point and heat of fusion were determined under a nitrogen atmosphere using a differential scanning calorimeter (DuPont 912 DCDSC), at a rate of temperature rise of 10° C./minute, the temperature at the lowest point of the endothermic curve being deemed to be the melting point ASTM D3418)

Glass transistion temperature was determined by differential mechanical analysis (DMA, ASTM E1640), at a rate of increase of 5° C./minute, operated under a nitrogen atmosphere. Storage Modulus is measured using the procedure ASTM D4065-82. Measurements are made of viscoelastic behavior using dynamic mechanical analysis, which provides information on an elastic component, known as the storage modulus, and on a viscous component, known as the loss modulus. Measurements made while the temperature is being changed lead to the information on the $T_g$ of the polymer; data on $T_g$ reported herein was obtained from a plot of storage modulus against temperature, $T_g$ being the temperature of significant decrease in storage modulus with increasing temperature.

Figure 2:
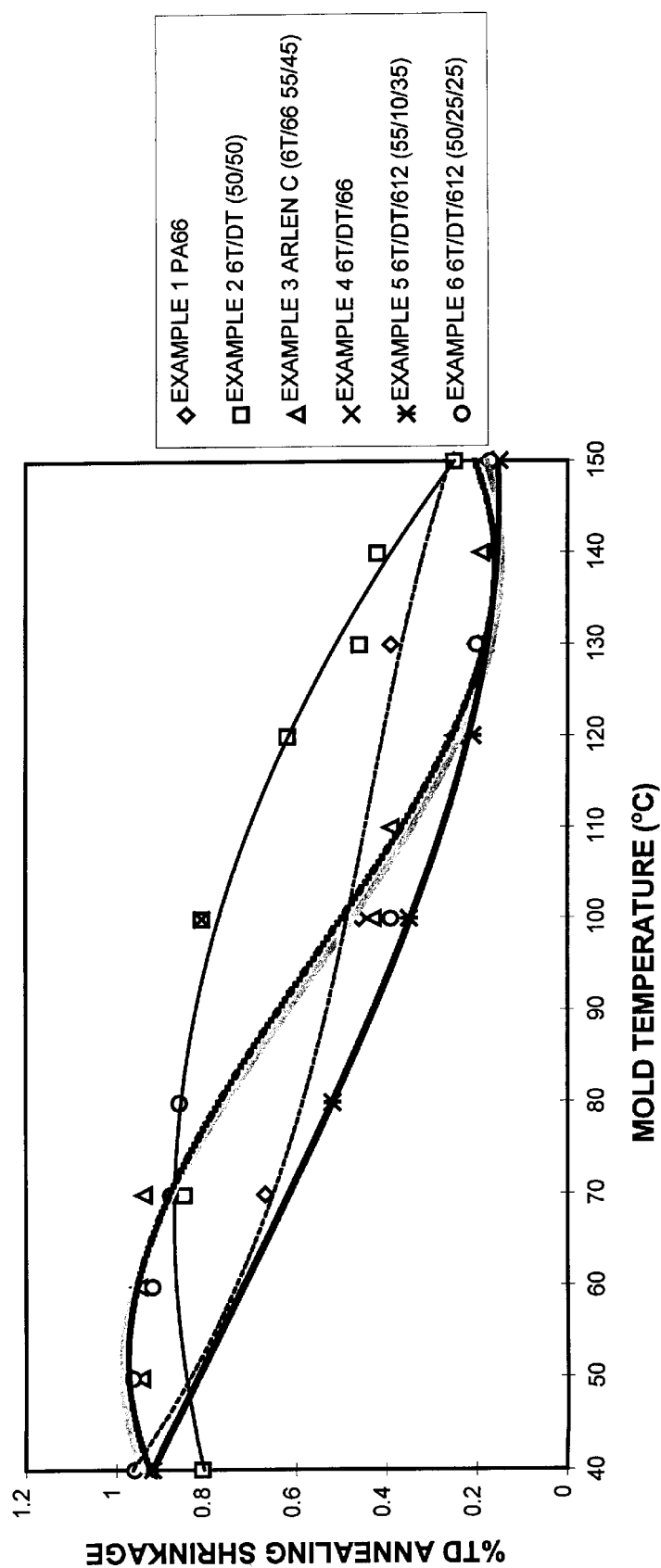

Results from the % TD annealing shrinkage determination and evaluation of the mechanical properties are summarized in Table 4. The mold temperature dependence of % TD annealing shrinkage is presented in Table 5, for Comparative Examples 1–7 and Examples C, I, J, K, L. Graphical representation of the effect of molding temperature on % TD annealing shrinkage is presented in FIG. 2.

As one can see, lowering the $T_g$ of 6T/DT, in order to improve its % TD annealing shrinkage while maintaining its high melt temperature cannot be accomplished through the partial replacement of TA with AA, the obvious choice since TA and AA are considered as "isomorphous". (see Comparative Example 4 in Tables 4 and 5). The 6T/DT/66 terpolymer has a $T_g$ considerably lower than 6T/DT copolymer (Comparative Example 3 in Tables 4 and 5) but still above that of 6T/66 (Comparative Example 2 in Tables 4 and 5), and as a result, its % TD annealing shrinkage is significantly higher. Furthermore, the mechanical performance of the 6T/DT/66 terpolymer is inferior to the 6T/66 copolymer. The obvious having failed, one can seek further reduction of $T_g$, while maintaining high temperature performance, through terpolymers based on longer chain dicarboxylic acids than adipic acid. A few examples, for which % TD annealing shrinkage was measured at 35% Glass, are presented also in Tables 4 and 5 (Comparative Examples 5–7): Example 5, a hexamethylene terephthalamide/2-methylpentamethylene terephthalamide/hexamethylene dodecanamide (6T/DT/612) at 55/10/35 molar ratio, where "12" stands for dodecanedioic acid; Example 6 the 6T/DT/612 terpolymer at 50/25/25 molar ratio and Example 7, a hexamethylene terephthalamide/2-methyl pentamethylene terephthalamide/hexamethylene sebacamide (6T/DT/610) terpolymer at 55/10/35 molar ratio, where "10" designates sebacid acid (decanedioic acid). These examples demonstrate clearly that performance at least equal to the commercial polymer of Comparative Example 2, if not superior, can be achieved through polymer formulations, more specifically, as we have shown here, with terpolymers based on 2 diacids, TA and another aliphatic dicarboxylic acid, and 2 aliphatic diamines, HMD and 2-MPMD.

Although Comparative Examples 5–7 offer an excellent balance of mechanical performance, high temperature capability, crystallinity potential developed as fully as, or even better than Comparative Example 2, and low % TD annealing shrinkage, as evidenced by the data presented in Tables 4 and 5, their "blistering resistance" under Surface Mount Technology conditions for Infrared solder reflow is inferior to Example 2. This is discussed in more detail in the next section.

TABLE 4

COMPARISON OF MECHANICAL PERFORMANCE OF HIGH TEMPERATURE NYLONS @ 35% GR

| EXAMPLE | POLYMER | MONOMER MOLAR RATIO | ASTM D-638 TENSILE STR (MPA) | ASTM D-638 ELONG. % | ASTM D-790 FLEX. MOD. (MPa) | ASTM D-648 HDT ('C) @264 psi | % TD ANNEALING SHRINKAGE (100° C.) 0.8 mm | 1.6 mm | 3.2 mm | ASTM E-793 CRYST. % | ASTM E-1640 DAM Tg (oC) (DMA) |
|---|---|---|---|---|---|---|---|---|---|---|---|
| 1 | N66 | n/a | 196 | 10.3 | 9,789 | 254 | 0.47 | — | — | 100 | 61 |
| 2 | 6T/66 | 55/45 | 220 | 2.78 | 11,485 | 295 | 0.43 | 0.31 | 0.16 | 100 | 94 |
| 3 | 6T/DT | 50/50 | 230 | 2.8 | 11,485 | 263 | 0.87 | 0.53 | 0.43 | 43 | 125 |
| 4 | 6T/DT/66 | 50/30/20 | 194 | 2.3 | 10,341 | 273 | 0.81 | — | — | 92 | 98 |
| 5 | 6T/DT/612 | 55/10/35 | 216 | 2.74 | 11,127 | 266 | 0.35 | 0.26 | 0.17 | 100 | 70 |
| 6 | 6T/DT/612 | 50/25/25 | 212 | 2.58 | 11,148 | 276 | 0.39 | 0.28 | 0.20 | 100 | 73 |
| 7 | 6T/DT/610 | 55/10/35 | 210 | 2.57 | 11,416 | — | — | 0.21 | 0.12 | 100 | — |
| C | 6T/6,12 | 60/40 | 212 | 2.44 | 10,224 | 265 | 0.3 | — | — | 100 | 59 |
| D | 6T/6,12 | 65/35 | 206 | 2.22 | 10,414 | 265 | 0.27 | — | — | 100 | 78 |
| E | 6T/6,12 | 70/30 | 157 | 3.61 | 10,215 | — | 0.32 | 0.17 | 0.08 | 100 | 86 |
| I | 6T/6,10 | 60/40 | 224 | 2.75 | 9,917 | 265 | 0.25 | — | — | 100 | — |
| J | 6T/6,10 | 65/35 | 194 | 2 | 10,515 | 280 | 0.24 | — | — | 100 | — |
| K | 6T/6,9HQ | 65/35 | 190 | 1.98 | 11,566 | — | 0.21 | — | — | 100 | 85 |
| L | 6T/6,9LQ | 65/35 | 192 | 1.85 | 12,279 | — | 0.28 | — | — | 100 | 84 |

TABLE 5

| EXAMPLE | POLYMER | MONOMER RATIO | % TD ANNEALING SHRINKAGE MOULD TEMPERATURE (° C.) | | | | | | | |
|---|---|---|---|---|---|---|---|---|---|---|
| | | | 40 | 70 | 80 | 100 | 120 | 130 | 140 | 150 |
| 1 | PA66 | na | 0.96 | 0.67 | — | 0.46 | — | 0.39 | — | 0.25 |
| 2 | 6T/66 | 55/45 | 0.93 | 0.94 | — | 0.43 | — | — | — | 0.18 |
| 3 | 6T/DT | 50/50 | 0.81 | 0.85 | — | 0.81 | 0.62 | 0.46 | 0.42 | 0.25 |
| 4 | 6T/DT/66 | 50/30/20 | — | — | — | 0.81 | — | — | — | 0.15 |
| 5 | 6T/DT/612 | 55/10/35 | 0.92 | — | 0.52 | 0.35 | 0.21 | — | — | — |
| 6 | 6T/DT/612 | 50/25/25 | 0.96 | — | 0.86 | 0.39 | — | — | — | — |
| C | 6T/6,12 | 60/40 | — | — | — | 0.3 | — | — | — | — |
| D | 6T/6,12 | 65/35 | — | — | — | 0.27 | — | — | — | — |
| E | 6T/6,12 | 70/30 | — | — | — | 0.32 | — | — | — | — |
| I | 6T/6,10 | 60/40 | — | — | — | 0.25 | — | — | — | — |
| J | 6T16,10 | 65/35 | — | — | — | 0.24 | — | — | — | — |
| K | 6T/6,9HQ | 65/35 | — | — | — | 0.21 | — | — | — | — |
| L | 6T/6,9LQ | 65/35 | — | — | — | 0.28 | — | — | — | — |

It appears then that, in order to achieve an acceptably low shrinkage, and a high % relative crystallinity in the molded part (see data in Table 4), the $T_g$ of the polymer ought to be $\leq 90°$ C. In describing the background of the invention above, we stated that not all copolymer formulations meeting the composition criteria:

(1) as diacids, TA and another aliphatic dicarboxylic acid of 9C, 10C or 12C, and
(2) HMD as diamine, would meet the performance criteria, i.e. "high temperature characteristics" and low TD annealing shrinkage, even when molded in "cold molds" (mold surface temperature $\leq 100°$ C.).

Blistering Resistance—for Applications Requiring a Flame Retardant Package.

Polyamide resin compositions have historically found limited use in electronic/electrical applications because of their moisture absorption characteristics, which can adversely affect their dimensional stability and their resistance to blistering under soldering conditions. There are several soldering methods available currently. They include vapor phase soldering, wave soldering, dip soldering, IR reflow soldering, and convectional reflow soldering. Flame retardant compositions of the copolymer claimed in this application provide superior soldering resistance as expected from the results of reflow soldering test shown in Table 7. For those applications, the presence of a flame retardant is essential to passing UL-94 V-0 flammability rating, in order to obtain UL qualification as electrical and electronic components.

The above mentioned soldering processes offer a highly productive method for surface mounted devices on electronic circuit boards. Blistering is the manifestation of expansion of trapped moisture, or gas, under soldering process conditions. Many other factors are known to have some influence on the phenomenon of blistering, such as part thickness, crystallinity and molding conditions (e.g. mold temperature, melt temperature), storage conditions (e.g. temperature, % RH, duration) and part design characteristics (i.e. thickness, length).

For many E/E connector applications polyamide 46, PPS, and LCP have been used. However, polyamide 46 is highly moisture sensitive, its moldings tend to be dimensionally unstable and blistering is frequently observed reflow soldering process conditions. PPS tends to cause corrosion problems and part failure because of its brittleness. LCP can offer better performance than other materials but its weld line strength is low and price is high.

Flame Retardant Compositions: Compounding

The copolymer compositions described in this application can provide a flame retardant resin which can be molded as electric/electronic devices. These will in turn offer an acceptable blistering resistance under soldering process conditions. Several flame retardant compositions were evaluated (see TABLE 6 below for detailed composition). All flame retardant compositions cited as examples in Table 6 were compounded on a TEX44 twin screw extruder under conditions known to those skilled in the art. The copolymer-based compositions are less sensitive to moisture than PA46 or PA6T/66, and of higher crystallinity than the 6T/DT copolymer or its blends, and display superior resistance to blistering.

Flame Retardant (FR) Compositions: Blistering Resistance

The major purpose of the soldering evaluation is to determine the temperature performance against blistering after moisture conditioning at 40° C. under 95% RH for 96 hours. Thin flex bars (0.8 mm) or small connectors (0.4 mm wall thickness) were molded from the compositions described in TABLE 6 and their blistering resistance was compared under conditions typical of the infrared soldering process. A SOLSYS 250IR infrared reflow soldering machine by Nihon Antom was used for all experiments. The samples reached a temperature of 250° C. in the oven with approximately 30 seconds exposure at peak temperature, after preheating the parts to 150–160° C. for one minute. The results of the blistering resistance tests are presented in TABLE 7.

The conditioning at 40° C. 95% RH is severe by North American standards, but a great portion of these electronic connectors, destined for the world market, will be assembled in Asia Pacific, where average temperatures and % RH are high. Without moisture conditioning or dipping into water at room temperature, 6T/66 (55/45), a standard material in the market, can provide 260–270° C. of maximum reflow soldering temperature when evaluated "dry-as-molded".

Reflow soldering performance of the 6T/DT-based composition (Comparative Example 3) was not acceptable for SMT applications, because the composition showed significant blistering at a rather low temperature of 210° C. although some specimens were molded at a mold temperature of 150° C., as shown in Table 7 below. Even "Dry As Molded", the composition showed blistering at 220° C.

The 6TDT610 (55/10/35) terpolymer composition (Comparative Example 7) provides a significantly improved reflow soldering performance over 6T/DT (50/50) with a maximum soldering temperature of 220° C. after 96 hours of conditioning. The improved performance of Comparative Example 7 is, however, not competitive in the market because of existing products such as 6T/66 (55/45).

Exactly the same Glass Reinforced/Flame Retardant formulation as 6T/66 (55/45), and from the same extruder, was used for compounding the 6T/612 (65/35) copolymer (Example D). Reflow resistance was significantly improved with the 6T/612 (65/35) composition of Example D, by about 20° C. A significantly lower moisture absorption (1.39% vs 2.44%) is a major contributor to this performance improvement. The copolymer of Example D offers the capability of significantly improving the blistering resistance of flame retardant resin compositions for SMT connector applications, while maintaining low % TD annealing shrinkage and adequate mechanical performance.

TABLE 6

| | FLAME RETARDANT COMPOSITIONS | | | | |
|---|---|---|---|---|---|
| EXAMPLE | 6 | 7 | 3 | 2 | D |
| Base Polymer | 6T/DT/612 | 6T/DT/610 | 6T/DT | 6T/66 | 6T/612 |
| Polymer wt % | 40.8 | 40.8 | 39.95 | 40.8 | 40.8 |
| Polydibromostyrene wt % (PDBS-80) (1) | 24 | 24 | 19 | 24 | 24 |
| Sodium Antimonate | 4.0 | 4.0 | — | 4.0 | 4.0 |
| Sodium Pentoxide | — | — | 4.0 | — | — |

TABLE 6-continued

FLAME RETARDANT COMPOSITIONS

| EXAMPLE | 6 | 7 | 3 | 2 | D |
|---|---|---|---|---|---|
| Glass Fiber | 30.0 | 30.0 | 35.0 | 30.0 | 30.0 |
| Magnesium Oxide | — | — | 0.7 | — | — |
| SURLYN 8920 (Ionomer, DuPont) | 1.0 | 1.0 | 1.0 | 1.0 | 1.0 |
| Oxidized PE | 0.2 | 0.2 | — | 0.2 | 0.2 |
| Wax OP (Hoechst) | 0.1 | 0.1 | 0.2 | 0.1 | 0.1 |
| Talc | — | — | 0.35 | — | — |

NOTE:
(1) Poly(Dibromostyrene)(e.g. PDBS, PDBS-80) is the polymer obtained from chain growth (radical) polymerization of dibromostyrene monomer.

TABLE 7

EFFECT OF BASE MATRIX ON BLISTERING RESISTANCE

| Example | 6 | 7 | 3 | 3 | 2 | D |
|---|---|---|---|---|---|---|
| Base Matrix | 6T/DT/612 | 6T/DT/610 | 6T/DT | 6T/DT | 6T/66 | 6T/612 |
| FR | PDBS | PDBS | PDBS | PDBS | PDBS | PDBS |
| PHYSICALS AT 1/8" | | | | | | |
| TS (Mpa) | 123 | 167 | | | 150 | 144 |
| E % | 1.3 | 1.9 | | | 1.84 | 1.63 |
| FS (Mpa) | 162 | 230 | | | 208.6 | 201.3 |
| FM (Mpa) | 8651 | 8657 | | | 10189 | 9994 |
| NI (J/m) | 65 | 96 | | | 73.1 | 78.2 |
| HDT (18.5 Kg/cm$^2$) °C. | | | | | 280 | 271 |
| Reflow Soldering (AFTER 96 hrs/40° C./ 95% RH) | | | | | | |
| Mold Temp. | 120 | 120 | 120 | 150 | 120 | 120 |
| Moisture (%) | 1.68 | 1.63 | 2.20 | 2.00 | 2.44 | 1.39 |
| 210° C. | X | OK | X | X | OK | OK |
| 220 | X | OK | X | X | OK | OK |
| 230 | X | X | X | X | OK— | OK |
| 240 | — | — | — | — | X | OK |
| 250 | — | — | — | — | — | OK— |

OK: no blistering
OK—: slightly blistered close to gate
X: most of part shows blisters
For examples 2, 3, 6, 7, D: 0.8 mm thick flex bars were molded and tested

| GLOSSARY OF ABBREVIATIONS | |
|---|---|
| 66 | hexamethylene adipamide |
| 610 | hexamethylene sebacamide |
| 612 | hexamethylene dodecanamide |
| 61 | hexamehtylene isophthalamide |
| 6T | hexamethylene terephthalamide |
| 6T/6 | hexamethylene terephthalamide/polycaprolactam |
| ASTM | American Standard Testing Method |
| D | 2-methyl pentamethylene diamine |
| DAM | "dry-as-molded" |
| DMA | dynamic mechanical analysis |
| DSC | differential scanning calorimetry |
| DT | 2-methyl pentamethylene terephthalamide |
| E/E | electronic/electrical |
| HDT | heat deflection temperature |
| HMD | hexamethylene diamine |
| IA | isophthalic acid |
| I/M | injection molding |
| IR | infrared |
| IV | inherent viscosity |
| LCP | Liquid Crystal Polymer |
| 2-MPMD | 2-methyl pentamethylene diamine |
| Nylon 46 | polytetramethylene adipamide |
| PA66 | polyhexamethylene adipamide |
| PCV | pressure control valve |
| PDBS | Polydibromostyrene |
| PPS | polyphenylene sulfide |
| SMT | surface mount technology |
| TA | terephthalic acid |
| TD | transverse direction |
| $T_g$ | glass transition temperature |
| $T_m$ | melting temperature |
| $T_{melt}$ | temperature of the polymer melt in the reactor |

What is claimed is:

1. A flame retardant polymer composition comprising:
   A) 20–18 weight % of a semi-crystalline semi-aromatic polyamide copolymer comprising i) terephthalic acid and at least one other aliphatic acid having 9 to 12 carbon atoms and ii) hexamethylene diamine, wherein terephthalic acid is present in amounts in the range of 55–80 mole % of the diacid monomers and said other aliphatic acid is present in the range of 45–20 mole % of the diacid monomers, and the polymer has a $T_g$ of less than or equal to 90° C. and a $T_m$ of at least 295° C.;
   B) 0–50 weight % of inorganic fillers selected from the group consisting of glass fiber, glass flakes, carbon fibers and mineral fillers and any combination of said fillers;
   C) 10–35 weight % of a flame retardant containing 50–70 weight % bromine; and
   D) 1–10 weight % of a flame retardant synergist selected from the group consisting of antimony compounds, other metal oxides and combinations thereof.

2. The flame retardant polymer composition of claim 1 comprising:
   A) 20–80 weight% of a semi-crystalline, semi-aromatic polyamide copolymer comprising i) terephthalic acid and at least one other aliphatic acid having 9 to 12 carbon atoms and ii) hexamethylene diamine, wherein terephthalic acid is present in amounts in the range of 65–80 mole % of the diacid monomer and said other aliphatic acid is present in the range of 35–20 mole % of the diacid monomer, and the polymer has a Tg of less than or equal to 90° C. and a $T_m$ of at least 295° C.;
   C) 10–35 weight % of a flame retardant containing 50–70 weight % bromine and selected from polydibromostyrene and brominated polyphenylene oxide; and
   D) 1–10 weight % of a flame retardant synergist selected from the group comprising antimony compounds, other metal oxides and combinations thereof.

3. The flame retardant polymer composition of claim 1 comprising:
   A) 20–80 weight % of a semi-crystalline, semi-aromatic polyamide copolymer composed of i) terephthalic acid and at least one other aliphatic acid having 9 to 12 carbon atoms and ii) hexamethylene diamine, wherein terephthalic acid is present in amounts in the range of 70–80 mole % of the diacid monomer and said other aliphatic acid is present in the range of 30–20 mole % of the diacid monomer, and the polymer has a Tg of less than or equal to 90° C. and a $T_m$ of at least 295° C.;
   C) 10–35 weight % of polydibromostyrene which contains 50–70 weight % bromine; and
   D) 1–10 weight % of sodium antimonate.

4. Molded articles formed from the polyamide resin composition of claim 1.

5. The molded articles as claimed in claim 4 selected from the group consisting of connectors, bobbins, switches, terminals and other electronic and electrical devices.

6. The flame retardant polymer composition of claim 1 wherein A) is a copolymer of 6T/612.

7. The fire retardant polymer composition of claim 1 comprising
   A) 40.8 weight % of a 6T/612 (65/35) semi-crystalline, semi-aromatic polyamide copolymer having a Tg of 78° C. and a Tm of 306° C.;
   B) 30 weight % of glass fiber as an inorganic filler;
   C) 20 weight % of brominated polystyrene containing 50–70 weight % bromine as a flame retardant; and
   D) 4 weight % of sodium antimonate as a flame retardant synergist.

* * * * *